United States Patent [19]

Kondo et al.

[11] Patent Number: 4,809,271

[45] Date of Patent: Feb. 28, 1989

[54] VOICE AND DATA MULTIPLEXER SYSTEM

[75] Inventors: Kazuhiro Kondo, Kokubunji; Toshiro Suzuki, Tama; Takanori Miyamoto, Fuchu, all of Japan

[73] Assignee: Hitachi, Ltd., Tokyo, Japan

[21] Appl. No.: 119,924

[22] Filed: Nov. 13, 1987

[30] Foreign Application Priority Data

Nov. 14, 1986 [JP] Japan ............................ 61-209660

[51] Int. Cl.$^4$ ............................................. H04J 3/12
[52] U.S. Cl. .................................................. 370/110.1
[58] Field of Search ............. 370/110.1, 85, 34, 110.2, 370/110.3, 109; 358/11; 381/31

[56] References Cited

U.S. PATENT DOCUMENTS

| 4,476,559 | 10/1984 | Brolin et al. | 370/110.1 |
| 4,479,213 | 10/1984 | Galand et al. | 370/110.1 |
| 4,528,659 | 7/1985 | Jones, Jr. | 370/110.1 |

FOREIGN PATENT DOCUMENTS 59-225620 of 1984 Japan .

OTHER PUBLICATIONS

Takanori Miyamoto, Kazuhiro Kondo, Toshiro Suzuki, Yoshiaki Asakawa, Akira Ichikawa; Proceedings of IEEE-IECEJ-ASJ International Conference on Acoustics, Speech, and Signal Proceedings; Apr. 7-11, 1987; pp. 1717-1720.

Primary Examiner—Douglas W. Olms
Assistant Examiner—Frank M. Scutch, III
Attorney, Agent, or Firm—Pennie & Edmonds

[57] ABSTRACT

A system in which two stations are respectively provided with telephones and data terminals such that a voice and data are multiplexed for communication between the two stations. Each station has a circuit to convert voice signals inputted from the telephone into a plurality of kinds of predetermined voice parameters, a circuit to determine a transmission mode depending on a predetermined parameter of the voice signals, a circuit to extract data having a length corresponding to the transmission mode from data to be transmitted from the data terminal, a circuit to select one of the plurality of voice parameters depending on the transmission mode, and a unit to edit a mode indicator indicating the transmission mode, the selected voice parameter, and the extracted data into a transmission block format corresponding to the transmission mode. The transmission block includes only voice information containing all voice parameters in the first mode; voice information and data information in the second mode, and voice information containing the minimum voice parameters and data information in the third mode.

6 Claims, 6 Drawing Sheets

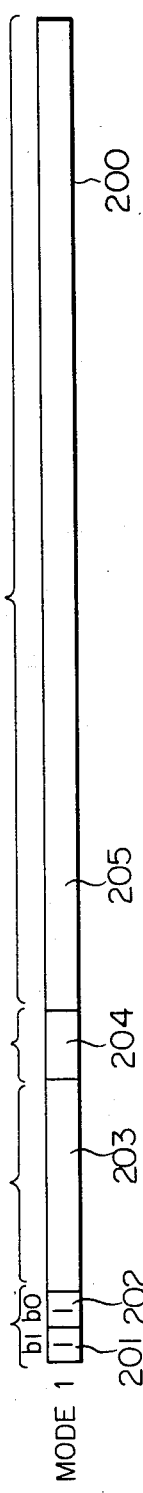
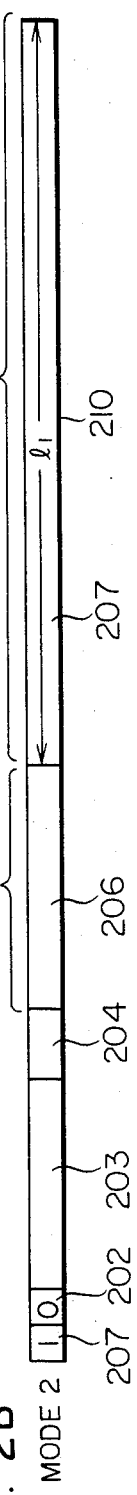
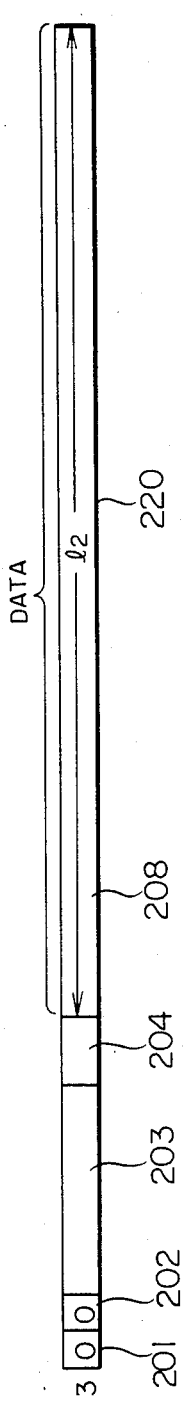
FIG. 2A
FIG. 2B
FIG. 2C

VOICE AND DATA MULTIPLEXER SYSTEM

BACKGROUND OF THE INVENTION

The present invention relates to a multiplexer system, and in particular, to a multiplexer system of voice and data communication in which a plurality of communication stations multiplex a plurality of kinds of information items into transmission block format so as to communicate information via transmission lines with a high transmission efficiency.

In a conventional system in which two stations connected via a transmission path are respectively provided with telephones and data terminals such that a voice from a telephone and data from a terminal are multiplexed on the transmission path so as to be communicated between the stations, the voice transmission takes precedence over the data transmission so long as there exists a voice input so as to send only voice information, namely, when the voice input is stopped, only the data is transmitted. As such a conventional multiplexed transmission system for voice and data communication, there has been known a system, as described in the JP-A-No. 59-225620, in which when a station on the transmission side does not effect a transmission, data is transmitted by using the overall frequency band of the transmission spectrum. This is accomplished by changing the bit rate of the data and the frequency of the carrier of the data in a modulator, and the change in the frequency of the carrier is detected by a station on the reception side so as to achieve a change-over to the mode for a reception of the data. In the conventional transmission system, however, also during a short period of time of a voice such as words uttered to chime in during a conversation, the transmission of the voice takes precedence over the data transmission, which results in a deterioration of the data transmission efficiency. Furthermore, according to the conventional system, since only data is sent in a period of time where the conversation is interrupted, the background sound received by each telephone is not transmitted to the communicating telephone during this period of time. Consequently, in the conversation, there intermittently appears a period of time where the voice of the partner of the conversation as well as the background sound cannot be heard, which leads to a problem that the speaker of the telephone feels a certain uneasiness.

SUMMARY OF THE INVENTION

It is therefore an object of the present invention to improve the data transmission efficiency in a system in which voice information and data are multiplexed for the communication thereof.

Another object of the present invention is to provide a system in which a complete silence period on the receiver side is avoided so that the user of a telephone does not feel unfamiliarity during the conversation.

In order to achieve these objects, according to the present invention, in a system in which two stations are respectively provided with telephones and data terminal means such that voice information and data are multiplexed so as to be communicated between the stations, each of the stations comprises:

first means for analyzing characteristics of voice signals inputted from said telephone so as to convert the voice signals into a plurality of kinds of voice parameters;

second means for determining a transmission mode corresponding to a predetermined parameter of said voice signals;

third means for extracting from data to be transmitted from said data terminal means data having a length corresponding to said transmission mode;

fourth means for selecting at least one of said plurality of voice parameters according to said transmission mode; and fifth means for editing into a transmission block format depending on said transmission mode a mode indicator designating said transmission mode, voice information including voice parameters selected by said fourth means, and the data extracted by said third means.

In the system according to the present invention, to process data received from a communicating station, said each station comprises:

sixth means for separating a received block transmitted from the communicating station into voice information and data according to a content of the mode indicator in said block;

seventh means for composing voice parameters included in the voice information separated by said sixth means a voice based on the content of the mode indicator; and eighth means for converting the data separated by said sixth means into data having a length corresponding to the content of the mode indicator so as to send the data to said data terminal.

The first means here extracts from the inputted voice signals a first parameter representing a vocal sound, a second parameter designating a magnitude of the voice signal, namely, an amplitude thereof, and a third parameter indicating a property of a voice of which the characteristics vary among persons.

The second means selects, based on a predetermined parameter value of a voice signal to be transmitted or predetermined parameter values respectively assigned to a transmission voice signal and a reception voice signal, an optimal transmission mode corresponding to the state of an inputted voice. According to an embodiment of the present invention, the system selects one of the first, second, and third modes.

The third means determines depending on the mode signal the length of data to be sent to the communicating station at the respective transmission chance. For example, the maximum data length (bits) for the transmission at a time is set to $l_2$ and $l_1$ ($l_1 < < l_2$) in the third and second transmission modes, respectively. The length of the transmission data is 0 in the first mode where the transmission of voice data takes precedence over the other transmission.

The fourth means selects all of the first, second, and third parameters in the first transmission mode; the first and second parameters as well as the third parameter compressed (e.g. intermittently subjected to a decimation operation) in the second transmission mode; and only the first and second parameters in the third transmission mode.

The fifth means effects a multiplexing operation of voice information (the first, second, and/or third parameters) and data selected by the third and fourth means depending on the transmission mode and ah identifier designating the transmission mode according to the predetermined format and transmits these items in a form of a data block to the communicating station.

The seventh means includes means to generate a noise signal (parameter) such that when the content of the mode indicator denotes a predetermined mode, the noise parameter is mixed with at least one of the reception voice parameters.

According to the embodiment of the present invention, when the content of the mode indicator is the third mode, the noise signal is synthesized from the first and second parameters of the voice.

According to the present invention, since each data block includes a transmission mode indicator, a station receiving a data block can separate the data block into voice information and data based on the transmission mode identifier so as to send a synthesized voice signal and data to a telephone and a data terminal, respectively. In this case, since each data block includes at least one of a plurality of kinds of parameters extracted from the input to a transmitter by the first means, a synthesized voice output can be attained at a reception of the data block in any cases, which prevents the output to the receiver from causing a complete silence state.

BRIEF DESCRIPTION OF THE DRAWINGS

The above and further objects and novel features of the invention will more fully appear from the following detailed description when the same is read in connection with the accompanying drawings in which:

FIG. 2A is a format diagram of a transmission block in the mode 1 according to the present invention;

FIG. 2B is a format diagram of a transmission block in the mode 2 according to the present invention;

FIG. 2C is a format diagram of a transmission block in the mode 3 according to the present invention;

DESCRIPTION OF THE PREFERRED EMBODIMENTS

Figure 1:
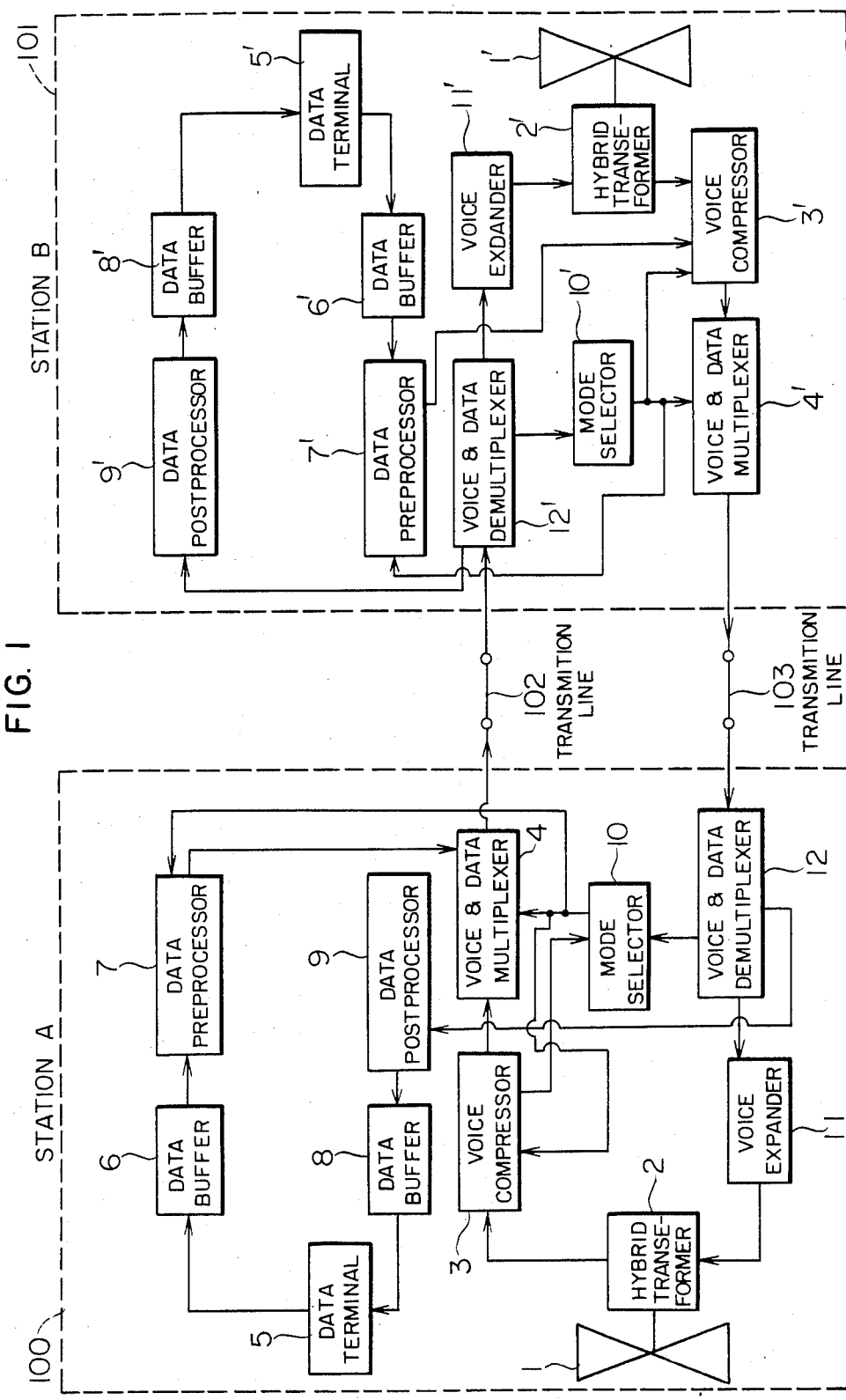
FIG. 1 is a block diagram schematically showing a multiplexer system according to the present invention.

FIG. 1 is a schematic block diagram showing an embodiment of a voice and data multiplexer system according to the present invention. This configuration includes a station A 100 and a station B 101 connected via transmission paths 102-103 to each other. A voice signal inputted from a telephone 1 to the station A 100 is delivered via a hybrid transformer 2 to a voice compressor 3, which functions to remove redundancy of the voice and to reduce the bandwidth dedicated to the voice. For example, as the voice compressor 3, such a known apparatus as a multipulse system, a residual excited linear predictive system, or a thinned out residual system is employed. The voice compressor 3 converts the inputted voice signal into voice information in a format corresponding to a mode signal outputted from a mode selector 10 to be described later and outputs the obtained voice information.

On the other hand, data inputted from a data terminal 5 is temporarily stored in a data buffer 6. When there exists a chance to transmit the data via the transmission line 102, a data preprocessor 7 sequentially reads the data from the buffer 6, splits the data in units each having a data length corresponding to the mode signal from the mode selector 10, and sends the resultant data to a multiplexer 4.

The multiplexer 4 multiplexes said voice information and data according to one of the three formats corresponding to the mode signal and transmits resultant transmission information to the transmission line 102.

On receiving information multiplexed and sent from the station B 101, a demultiplexer 12 demultiplexes received information into voice information and data depending on one of the three formats indicated by a mode indicator included in the received information.

When voice information is received, a voice expander 11 decodes received voice information into voice signals through a processing corresponding to the mode indicator. The receiver of the call can hear through a telephone set the voice signal processed by the hybrid transformer 2.

In addition, buffer 8 is used to temporally store data demultiplexed by the voice and data demultiplexer 12 and to output the data to the data terminal 5 in conformity with a reception speed unique to the data terminal 5.

Figure 3:
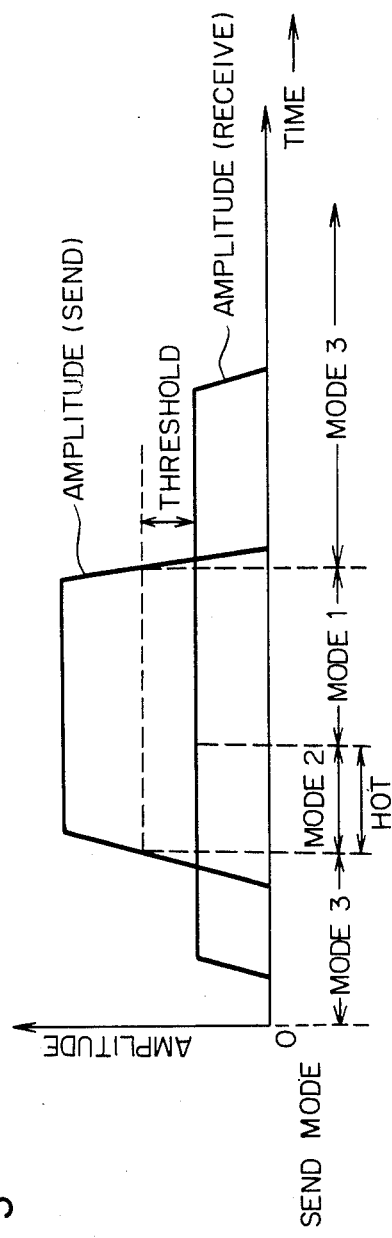
FIG. 3 is a graph showing relationship among the transmission amplitude, the reception amplitude, and the transmission modes in an embodiment of the multiplexer system according to the present invention.

The mode selector 10 compares transmission amplitude information and reception amplitude information inputted from the data terminal 5 or the telephone 1 and outputs as a result a mode signal determining a transmission mode. FIG. 3 is a graph showing relationships among the respective transmission modes, the transmission amplitude, and the reception amplitude. When the reception amplitude is greater than the transmission amplitude, the mode selector 10 decides the transmission mode to be "3". When the transmission amplitude by the width of the threshold exceeds the reception amplitude, the mode signal is changed to be "2". Furthermore, if the mode "2" is kept unchanged for a fixed period of time, the mode signal is changed to "1". The period of time elapsed by the time when the mode transition to "1" occurs is called a hangover time (HOT).

Figure 4:
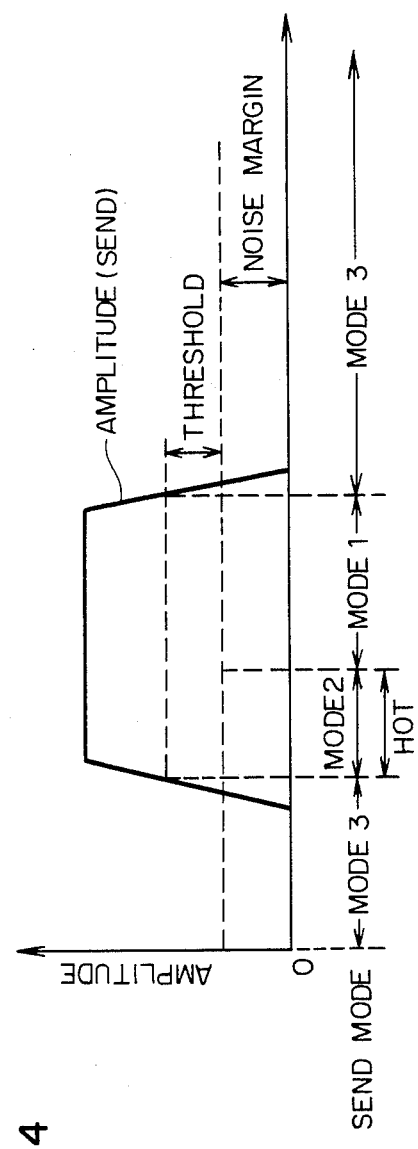
FIG. 4 is a graph illustrating relationship among the transmission amplitude, the noise margin value, and the transmission modes in an alternative embodiment of the multiplexer system according to the present invention.

Moreover, in a variation of the embodiment of the mode selector 10 in a simple configuration according to the present invention as shown in FIG. 4, there is employed only transmission amplitude information to select a transmission mode such that based on the absolute value of the transmission amplitude (the total of the noise margin and the threshold), a mode signal may be outputted to determine a transmission mode.

Although only the configuration of the station A 100 has been described, the components 1'-12' of the configuration of the station B 101 can also effect the similar operations.

FIGS. 2A-2C are schematic diagrams respectively showing transmission block formats in the transmission lines of a transmission system according to the present invention.

FIG. 2A shows a transmission block used when the mode signal delivered from the mode selector 10 indicates "mode 1". More concretely, in the mode 1, as shown in FIG. 3, reception voice information does not contain a voice signal and transmission voice information contains a voice signal, namely, the communicating station is receiving the voice transmitted from the initiating station. Consequently, in this mode 1, in order to supply a voice signal having a high quality to the communicating station, the voice signal is transmitted by use of entire information 205 of the transmission block.

A transmission information block 200 in the mode 1 comprises mode indicator bits 201-202 ($b_0=1$, $b_1=1$) designating that transmission information is associated with "mode 1", a parameter set 203 (LPC parameter) representing a spectral envelope of the voice signal, amplitude information 204 (amplitude) denoting the amplitude of the voice signal, and information 205 (thinned out residuals (TOR) representing detailed information about the spectrum such as the interval pitch of the voice signal.

The receiving side recognizes this transmission information to be of the "mode 1" based on the mode indicator (the values of $b_0$ and $b_1$) and then decodes the voice signal by use of information items such as the linear predictive coding (LPC) parameter, amplitude information, and the thinned out residuals (TOR). In the mode 1, since the transmission block 200 does not include data, the data buffer is not loaded with data.

Next, FIG. 2C is a schematic diagram showing a configuration of a transmission block 220 in the "mode 3". In this mode 3, reception voice information includes voice signals, and the transmission voice information does not contain voice signals. In this case, in the information area of the transmission block, the voice information area is greatly reduced so as to allocate reduced area as the data information area.

The transmission block 220 in the mode 3 comprises mode indicator bits, an LPC parameter, and amplitude information, and data information 203 in place of information 205 used in the mode 1.

Corresponding to the indication of the "mode 3", the receiving station separates the received transmission information block into voice information and data so as to store the data in a data buffer. On the other hand, since received voice information does not include the TOR representing detailed structure of the spectrum, the receiving station cannot decode the voice. In general, however, since it has been well known that the background sound has a fine structure of the spectrum quite similar to that of the spectrum of the noise, the receiving station uses an apparatus producing such a noise so as to simulate detailed structure of the spectrum of background sound, which enables to reproduce the LPC of the reception block; furthermore, the volume of the sound is adjusted depending on the amplitude information, thereby regenerating the background sound. As a result, the property of the background sound is retained to some extent on the receiving side when the voice is reproduced, which consequently prevents the discontinuous change in the property of the background sound in the receiving station due to the presence and absence of the voice input in the transmitting station and hence the unnatural feeling is not caused in the receiving partner.

FIG. 2B is a schematic diagram showing a configuration of a transmission block 210 in the mode 2 (between the modes 1 and 3). In the "mode 2", received voice information includes a voice signal and transmitted voice information contains information corresponding to short (within the period of HOT) interruption voice signals as words to chime in.

The transmission block 210 in the "mode 2" comprises the LPC parameter, amplitude information, the TOR 206 including information of which the amount is greatly reduced, for example, through a periodic decimation as compared with that of the mode 1, and data 207 with a length corresponding to the decimated length of the TOR information.

Since the amount of TOR information of the transmission frame is decimated, the receiving station cannot correctly regenerate the fine spectrum structure of the voice signal. As a result, the quality of the voice signal reproduced on the receiving station is lower than that of the voice signal regenerated in the mode 1. However, deterioration of the signal quality may be ignorable in a short interruption voice signal such as words to chime in. Since the provision of the transmission format of the mode 2 prevents the complete interruption of the data transmission even when a short interruption voice signal is inputted, the efficiency of the data transmission can be increased in the transmission system. In this embodiment, although the LPC coefficient or factor is used as the spectrum envelope parameter, the partial correlation (PARCOR) coefficients, the line spectrum pair (LSP) factor, or the like may be employed in place of the LPC factor of FIGS. 2A-2C. Furthermore, any one of the voice power, the absolute maximum value of voice signal, the maximum value of residual signal may be used as the amplitude information.

Figure 5:
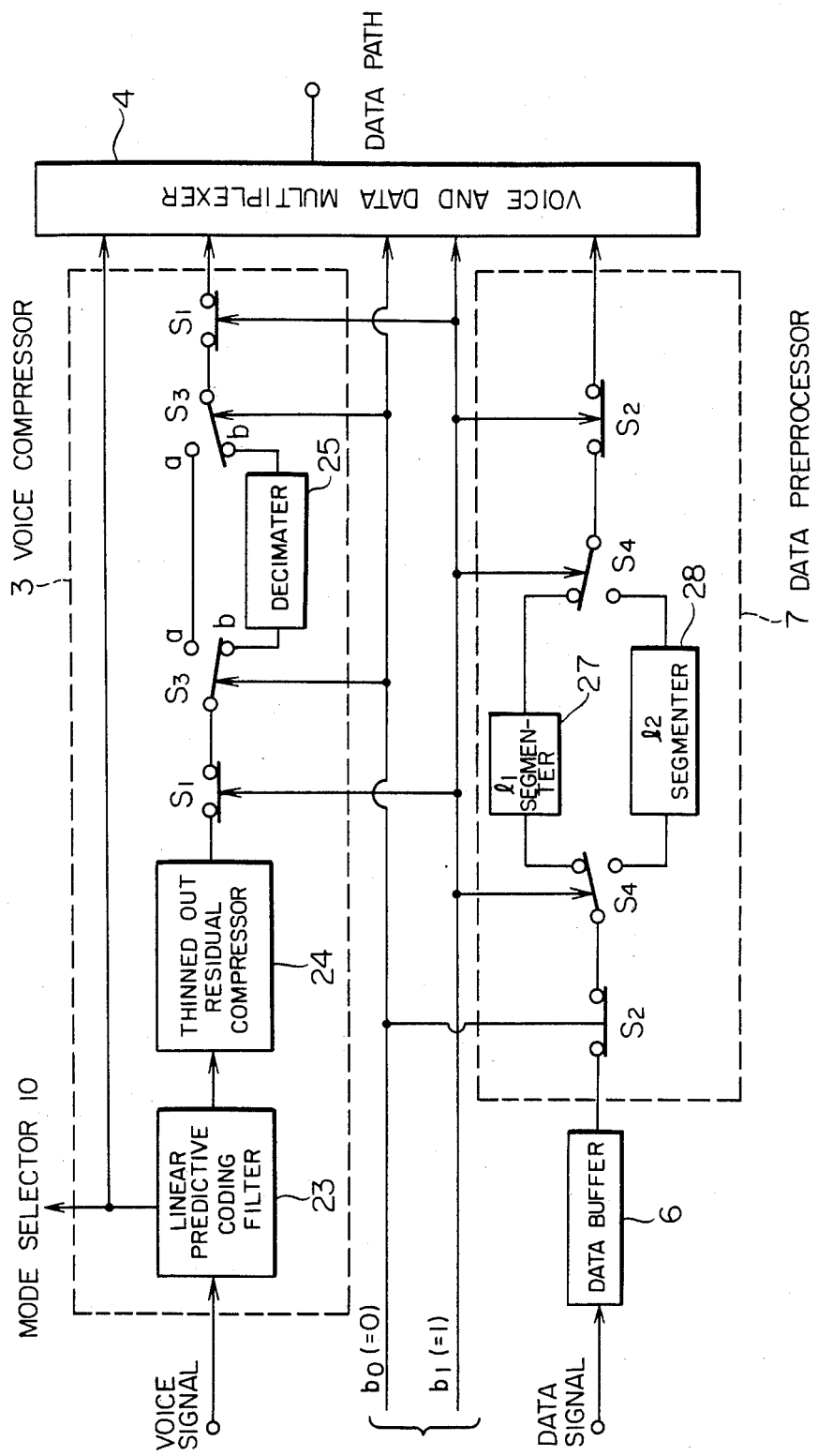
FIG. 5 is a schematic block diagram showing a transmitter section of each station constituting the multiplexer system according to the present invention.

FIG. 5 is a schematic block diagram showing a configuration of the voice compressor in the transmitter section in a case where the voice compressor includes a TOR compressor 24 in the multiplexer system according to the present invention. Since a method of compressing a voice using the residual compression has been well known (for example, described in the IEEE Proc. Intern. Conf. Acoust. Sp. Sig. Process. 86 pp. 1717-1720), the description thereof will be omitted. The voice signal inputted from a receiver is first supplied to an LPC filter 23 so as to be converted therein into a residual signal. In this operation, the LPC factor or coefficient included as a parameter in the spectrum envelope parameters calculated from the voice signal is sent to the multiplexer 4. The residual signal thus converted in the LPC filter 23 is fed to a residual compressor 24, which selects from the residual signal a representative residual signal most appropriately expressing the property of the residual signal so as to thin out the remaining signals, thereby effecting an information compression to a considerable extent. The representative residual signal is supplied via two switches $S_1$ and $S_3$ to the multiplexer 4. The switch $S_1$ is an on/off switch to be driven by the bit $b_1$ of the mode signal, namely, turns on when $b_1$ is "1" and turns off when $b_1$ is "0". The switch $S_2$ is an alternative selection switch to be driven by the bit $b_0$ of the mode signal, namely, a is connected when $b_0$ is "1" and b is connected when b is "0". As a result, for a combination of the mode signal bits $\{b_1, b_2\}=\{"1", "1"\}$, the representative residual is directly outputted to the multiplexer 4; for the mode signal bits $\{b_1, b_2\}=\{"1", "0"\}$, the representative residual is passed through a decimater 25 so as to be decimated, for example, every second representative residual is decimated and is then delivered to the multiplexer 4; and for the mode signal bits $\{b_1, b_2\}=\{"0", "0"\}$, the representative residual is not supplied to the multiplexer 4. There does not exist the combination of the mode signal bits $\{b_1, b_2\} = \{"1", "0"\}$. Incidentally, FIG. 5 shows the transmission state in the "mode 2" where the combination of the mode signal bits $\{b_1, b_2\} = \{"1", "0"\}$.

On the other hand, data is temporarily stored in a data buffer 6 and is then outputted via two switches $S_2$ and $S_4$ and a segmentor 27 to the multiplexer 4. The on/off switch $S_2$ is driven according to the value of b of the mode signal, whereas the switch $S_4$ of the alternative selection type is driven by the value of $b_1$. For a combination of the mode signal bits $\{b_1, b_2\} = \{"1", "1"\}$, the switch $S_2$ is opened and hence the data signal is not supplied to the multiplexer 4; for a combination of the mode signal bits $\{b_1, b_2\} = \{"1", "0"\}$, the data signal is split by the $l_1$ segmentor 27 into segment data items each having a length of $l_1$, which are then fed to the multiplexer 4; and for a combination of the mode signal bits $\{b_1, b_2\} = \{"0", "0"\}$, the data signal is split by the segmentor 28 into segment data items each having a length of $l_2$, which are then fed to the multiplexer 4. The value of $l_2$ represents a data length of data which can be transmitted when the representative residual is not contained in transmission information, whereas the value of $l_1$ is a data length of data which can be transmitted when the representative residual is decimated for a transmission, where $l_2 \gg l_1$. Incidentally, the segment data with the lengths $l_2$ and $l_1$ are identical to the information area 208 in the mode 3 of FIG. 2C and the information area 207 in the mode 2 of FIG. 2B, respectively.

The multiplexer 4 multiplexes received voice information and data according to the mode and then sends the resultant data to the transmission line.

Figure 6:
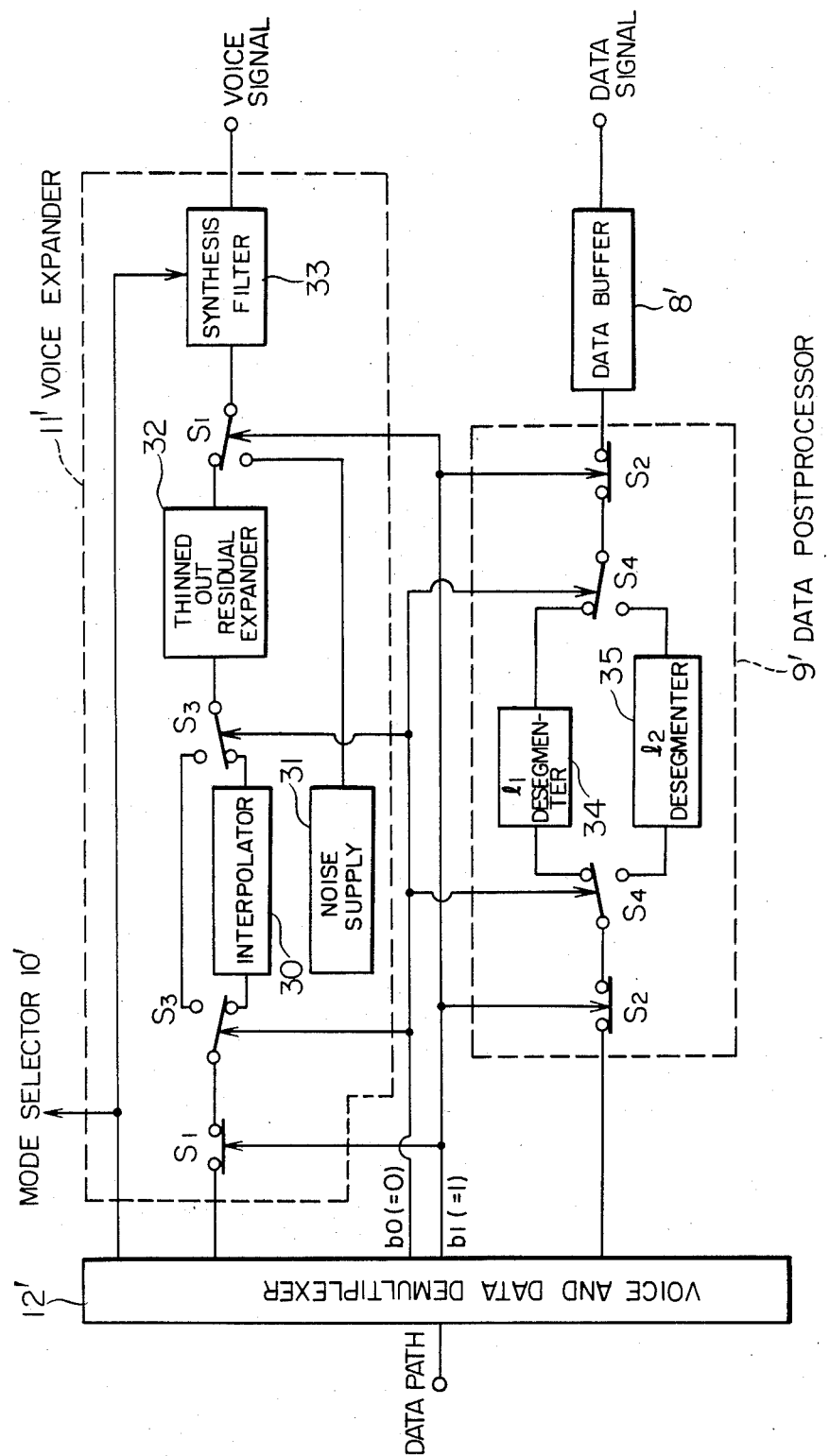
FIG. 6 is a schematic block diagram showing a receiver section of each station constituting the multiplexer system according to the present invention.

FIG. 6 is a schematic diagram showing a configuration of the receiver section of the station 101 of FIG. 1 in a case where the TOR compression system is used in the multiplexer system according to the present invention. Transmission information inputted from the transmission path 102 is first split by a demultiplexer 12' into voice information, data information, and a mode indicator. The representative residual value including the voice information passes through the on/off switch $S_1$ and the alternative selection switches $S_1$ and $S_3$ such that the values of residuals restored in different fashions depending on the mode are delivered to a synthesis filter 33.

For a combination of the mode indicator bits $\{b_1, b_2\} = \{"1", "1"\}$, the representative residual value inputted from the demultiplexer 12' is directly supplied to the residual expander 32 and the representative residual value is periodically repeated to supply the residual expander 32 with a residual signal, which is then fed to the synthesis filter 33. Incidentally, the residual expander 32 has been described in detail in the IEEE Proc. Inter. Conf. Acoust. Sp. Sig. Proc. pp. 1717-1720. On the other hand, for the mode indicator bits $\{b_1, b_2\} = \{"1", "0"\}$, since the representative residual value has been decimated, the representative residual value thus decimated is subjected to an interpolation in an interpolator 30, for example, by use of an interpolation function such as sin x/x so as to reproduce the complete representative residual. Based on the restored residual, a residual expander 32 achieves a residual expansion. Furthermore, for the mode indicator bits $\{b_1, b_2\} = \{"0", "0"\}$, transmission information does not include the representative residual. In this mode, however, since the voice signal is considered to have a property similar to that of a noise, a noise generator 31 is used to generate a noise having a characteristic of a white noise so as to simulate the residual signal, which is then delivered to a synthesis filter 33. Three residual signals thus attained undergo a synthesis processing in the synthesis filter 33 based on the LPC coefficient and amplitude information so as to be converted into a voice signal. Incidentally, FIG. 5 shows a reception state in the "mode 2" where the combination of the mode indicator bits $\{b_1, b_2\}$ is $\{"1", "0"\}$.

On the other hand, segment data sent from the transmission line is fed to a buffer 8' through the on/off switch S to be driven by the mode indicator bit b and the alternative selection switch S to be driven by the mode indicator bit $b_0$. For the combination of the mode indicator bits $\{b_1, b_2\} = \{"1", "1"\}$, since transmission information does not include data, the switch $S_2$ is opened and hence the data buffer 8' is not supplied with data. For the combination of the mode indicator bits $\{b_1, b_2\} = \{"1", "0"\}$, since segment data of which the length is $l_1$ is included, transmission information is fed to an $l_1$ desegmentor 34, which restores the segmented data into the original data to be supplied to a data buffer 8'. In addition, for the combination of the mode indicator bits $\{b_1, b_2\} = \{"0", "0"\}$, since segment data of which the length is $l_2$ is included, transmission information is fed to an $l_2$ desegmentor 35, which restores the segmented data into the original data to be supplied to a data buffer 8'. The data accumulated in the data buffer 8' is outputted in conformity with a reception speed of the data terminal. The descriptions above concerning FIGS. 5–6 also apply to a case where the stations A and B are exchanged in FIG. 1.

Figure 7:
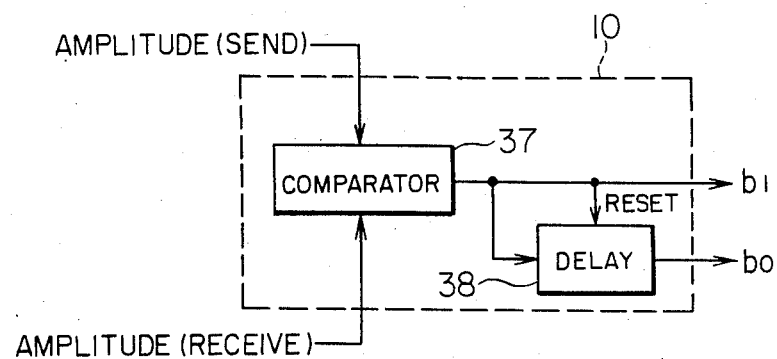
FIG. 7 is a schematic block diagram showing a mode judge section of each station constituting the multiplexer system according to the present invention.

FIG. 7 is a schematic block diagram showing a configuration of the mode selector 10 which outputs a mode signal. A comparator 37 in the mode selector 10 compares transmission amplitude information with the reception amplitude information. If the former is greater than the latter at least by the width of the threshold shown in FIG. 3, the comparator 37 outputs "1"; otherwise, the comparator 37 delivers "0". This output is directly used as the mode signal bit $b_1$. Furthermore, the value of b is delayed by a hangover time in a delay circuit 38, and the resultant value is used as that of $b_0$. The value of $b_0$, however, is reset to "0" when a rising edge of $b_1$ appears during or after the delay period.

Figure 8:
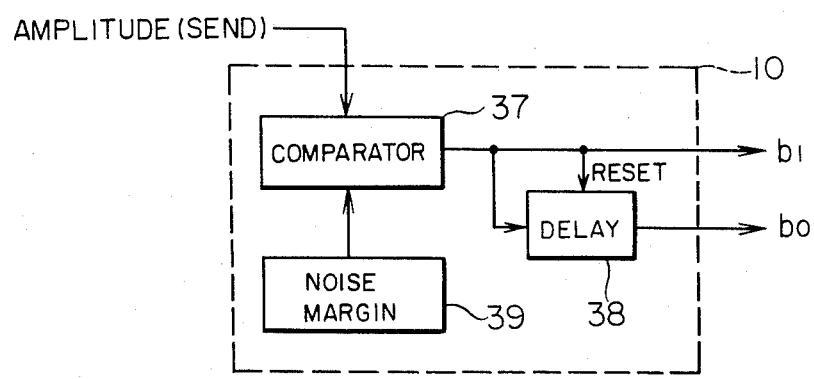
FIG. 8 is a block diagram schematically showing a variation of an embodiment of the mode selector section of FIG. 7.

FIG. 8 shows a case where the mode selector 10 effects a selection only by using transmission amplitude information, which corresponds to FIG. 4. In this case, a value is beforehand set to a noise margin section 39. When the transmission amplitude exceeds the noise margin value and the value of the threshold width, the mode signal bit $b_1$ (=1) is outputted as in the case of FIG. 7. The subsequent operations are similar to those of FIG. 7.

According to the present invention, in a case where a transmission channel has a transmission speed of 8 kbps, the period of time the voice signal occupies, for example, 35% of the total time, the "mode 2" associated with a short interruption such as words to chime in takes 5% thereof, $l_2$ is 124 bits, and $l_1$ is 62 bits, a data communication can be effected at a speed of 3.9 kbps on average in concurrence with a voice communication.

Although three modes are used in the embodiments, the configuration may be simplified by reducing the number of modes to two. Alternatively, when three or more modes are assumed, the change in the quality of a speech at an interruption can possibly be smoothed.

In the embodiments, since voice parameters such as a background sound are transmitted even when a voice input is not actually supplied in the first station, when the return attenuation is small in the hybrid transformer of the second station as the receiver, an echo of the voice signal is passed from the second station to the first station, and the speech quality of the system is deteriorated. In such a case, a distance between the respective parameters of transmission voice information and reception voice information is calculated. As a result, if the second station recognizes that the echo of the voice signal from the first station is included in transmission voice information sent from the second station, the second station applies an attenuation to amplitude information of the transmission voice information, thereby preventing the echo. However, when the second station attenuates the transmission amplitude, the volume of the background sound from the second station is also reduced, which may cause an unnatural feeling to the receiver of the speech. In this case, the first station sequentially substitutes a simulated voice parameter corresponding to the background sound monitored and recorded by the multiplexer of the first station, which enables to supply the receiver with the natural background sound not abruptly changing with the sound volume and property.

While the present invention has been described with reference to the particular illustrative embodiments, it is not restricted by those embodiments but only be the appended claims. It is to be appreciated that those skilled in the art can change and modify the embodiments without departing from the scope and spirit of the invention.

We claim:

1. A system in which two stations are respectively provided with telephones and data terminal means such that a voice and data are multiplexed for communication between said two stations, each said station comprising:
   means for converting voice signals inputted from said telephone into a plurality of kinds of predetermined voice parameters;
   means connected to said converting means for outputting a signal representing a transmission mode determined on the basis of a predetermined parameter of said voice signals;
   means for extracting from data to be transmitted from said data terminal data having a length according to said transmission mode signal;
   means connected to said converting means for selecting at least one of said plurality of voice parameters according to said transmission mode signal; and
   means connected to said extracting means and said selecting means for editing a mode indicator indicating said transmission mode, the selected voice parameter, and the extracted data into a transmission block format accordion to said transmission mode signal.

2. A system according to claim 1 wherein said each station further including:
   receiving means for separating a reception block sent from a communicating station into voice information and data;
   means connected to said receiving means for synthesizing a voice based on voice parameters included in said separated voice information and for outputting said voice to said telephone; and
   means connected to said receiving means for transmitting said separated data to said data terminal.

3. A system according to claim 1 wherein said mode signal outputting means determines the transmission mode from a value of one of said plurality of transmission voice parameters.

4. A system according to claim 2 wherein said mode signal outputting means determines the transmission mode from a value of one of said plurality of transmission voice parameters.

5. A system according to claim 1 wherein said mode signal outputting means determines the transmission mode based on a result of a comparison effected between one of said plurality of transmission voice parameters and one of said reception parameters.

6. A system according to claim 2 wherein said means for synthesizing the voice includes means for generating a noise parameter, and for synthesizing a voice on the basis of said noise parameter and at least one of said reception voice parameter when said mode indicator indicates a predetermined mode.

* * * * *

UNITED STATES PATENT AND TRADEMARK OFFICE
CERTIFICATE OF CORRECTION

PATENT NO. : 4,809,271

DATED : February 28, 1989

INVENTOR(S) : Kazuhiro Kondo; Toshiro Suzuki & Takanori Miyamoto

It is certified that error appears in the above-identified patent and that said Letters Patent is hereby corrected as shown below:

On the title page:

Foreign Application Priority Data should be listed as Japan............61-269660

Signed and Sealed this

Twenty-sixth Day of February, 1991

Attest:

HARRY F. MANBECK, JR.

Attesting Officer

Commissioner of Patents and Trademarks